United States Patent Office 3,463,848
Patented Aug. 26, 1969

3,463,848
EXPENDABLE MAGNESIUM CORES FOR USE IN CASTING PLASTICS OF ORGANIC POLYMERS
John C. St. Clair, Box 333, R.R. 2, London, Ohio 43140
No Drawing. Filed Jan. 11, 1967, Ser. No. 608,506
Int. Cl. B29c *1/06*
U.S. Cl. 264—238      1 Claim

ABSTRACT OF THE DISCLOSURE

A method for casting large and complicated plastic objects, using a magnesium core, in which, after the casting is made, the magnesium core is dissolved out by iodine, the iodine preferably being dissolved in ethyl ether. The magnesium is recovered for reuse by electrolyzing in the molten state or by heating to high temperatures the magnesium iodide formed by the reaction of the iodine on the magnesium core.

---

My disclosed method of casting plastics (or more precisely organic polymers) may be used to cast a wide variety of objects. However the big aim of my invention is to provide a cheap method for making automobile bodies and houses out of plastics.

The most efficient method for using a plastic is to cast it. In this way the plastic may be placed, at least in theory, in the places in a cast article where the plastic will give the maximum strength to the article. For example an inch thick sheet of solid plastic will be too weak to make a top for an automobile out of. However two 0.375 inch thick sheets of plastic held an inch apart by bars of plastic are much stronger than the inch thick sheet of plastic even though both methods of construction contain the same weight of plastic. The methods for predicting the strength of these highly desired hollow beams with hollow centers are very well known and accurate. These hollow beams or walls not only save plastic and give much higher strengths but also the hollow part can be filled with insulation and for houses provide a very well insulated wall. However there has not been devised previously a cheap method for supplying the cores necessary in casting plastics for the complex and large shapes used in houses and car bodies.

In the example given in the preceding paragraph of an automobile top the two 0.375 inch thick sheets of plastic are held an inch apart by bars of plastic. This makes the desired plastic automobile top have a hollow intricate internal configuration. I define a "hollow intricate internal configuration" as a configuration in which, like the example given, has a plurality of bracing bars cutting the hollow space in the article cast of plastic.

In this patent the term "cast" is defined as placing a liquid in a mold and having that liquid be changed into a solid that the mold and its core give a desired shape to. The liquid may be a molten plastic which on cooling forms a solid. The liquid may also be an organic liquid to which a suitable catalyst has been added. In the mold the catalyst causes the organic liquid to polymerize and form a solid. This latter method of casting is called "casting polymerization."

In this patent the term "core" is defined as a solid body placed inside a mold, when a polymer is cast, which serves the purpose of preventing the polymer from entering and being cast in certain predetermined volumes of the mold. In this the internal configuration of the hollow spaces inside the article cast can be said to be complementary to the configuration of the core.

In this patent the term "organic polymer" is defined as a substance made by polymerizing or joining together organic compounds.

In this patent the term "organic compound" is defined as meaning a compound having a molecule in which there is at least one hydrogen atom attached directly to a carbon atom.

Magnesium metal has very desirable properties as a material for making into cores. Magnesium may be easily cast as plates in iron molds. Then the plates may have slits sawed in them to provide the spaces for the plasitc bars to be cast that brace the outer plastic sheets of the final plastic casting. This sawing of the magnesium is very easy to do at elevated temperatures. Magnesium metal is very light which is a big advantage when casting plastic floors for houses where large cores are needed.

In casting thick pieces of plastic it is usually desired to have a hole through the magnesium core so that suitable liquids may be passed through the hole in the core during the casting process so as to control the temperature. A hole may be very easily put through the core by first casting an iron pipe in the magnesium core when the magnesium core is cast. Then the magnesium core is allowed to slightly fall below the melting point of the magnesium. Then the iron pipe is slightly heated internally by suitable heating means which will cause the magnesium around the pipe to melt and the iron pipe can be pulled out leaving a hole through the magnesium core.

After the plastic is cast and hardens in a mold in which the plastic article cast is formed around a magnesium core it is necessary to remove the cast and shaped article from the magnesium core. This is done by reacting the magnesium metal core with iodine dissolved in an inert solvent and removing the magnesium iodide formed dissolved in the solvent. That is, I dissolve out the magnesium core by a solution of iodine in an inert solvent. The inert solvent is preferably an ether with ethyl ether being the most preferred solvent.

Iodine dissolved in ethyl ether reacts rapidly with magnesium metal. Iodine in normal-butyl ether or in iso-amyl ether or in phenyl ethyl ether reacts more slowly than in ethyl ether.

Iodine is over 20% by weight soluble in ethyl ether at temperatures over 0° C. A saturated solution of magnesium iodide in ethyl ether contains 58.6% by weight of magnesium iodide at 40° C. However at 5.4° C. it contains only 1.45% magnesium iodide. As a result it is very easy to chill out the magnesium iodide from an ethyl ether solution. The magnesium iodide crystallizes out as the dietherate. However ethyl ether has also a very low heat of evaporation and the ethyl ether, as an alternate course, can be cheaply evaporated off leaving the dietherate of magnesium iodide. This dietherate is a liquid above 52° C. Magnesium iodide also forms dietherates with normal-butyl ether, iso-amyl ether and with phenyl ethyl ether, the dietherates being recovered in similar manners.

The ether is removed completely from the dietherate of magnesium iodide and ethyl ether by evaporating by heating the dietherate to about 165° C. This heating is preferably done under a vacuum. Normal-butyl ether, iso-amyl ether and phenyl ethyl ether are more difficult to remove from magnesium iodide, requiring a temperature of about 265° C.

The selection of inert solvents that are possible, for the solution of magnesium by iodine, is very large. Of course the inert solvent must not substantially dissolve the plastic. Information on what solvents do not dissolve a very large number of plastics or polymers may be obtained from "Polymer Handbook," by Brandrup and Immergut, Interscience Publishers, New York, 1966, pages IV–185 through IV–234.

The inert solvent must also dissolve iodine. From a survey of published solubilities of iodine in many solvents, as given in "Solubilities of Inorganic and Metal Organic Compounds" by Seidell, third ed., volume one, D. Van Nostrand, New York, it is concluded that iodine has sufficient solubility in about every liquid solvent otherwise desirable to be used with my invention. This is particularly true at higher temperatures.

The inert solvent used must also dissolve magnesium iodide. From the same reference on solubilities it is found that magnesium iodide is soluble, usually quite so, in ethers, ketones, nitriles, amides, acetals and aniline. It is also soluble in alcohols, organic acids and aldehydes but these compounds are normally too reactive to be used. From another source I found that magnesium iodide is probably at least slightly soluble in hot benzene.

It should be said that the presence of water is highly undesirable in the inert solvent since it reacts with the magnesium iodide. Iodine normally does not react with the pure organic compounds listed but oxygen containing compounds that can be reduced with magnesium iodide and magnesium should only be used with an excess of iodine in solution.

However despite the large number of inert solvents possible I have found ethyl ether to be usually the most preferred solvent.

The magnesium iodide recovered may be converted into magnesium metal and iodine by electrolysis for reuse. This I prefer to do by mixing the pure magnesium iodide into a melt of sodium chloride, potassium chloride, and magnesium chloride. If the latter three salts are in a molar ratio of 3 to 2 to 5, respectively, the melting point of the melt is 396° C.

The electrolysis is carried out in cells of graphite. My copending application, Ser. No. 603,443, for making of dense graphite makes graphite very suitable for making cheap graphite cells out of. In the bottom of each cell is a layer of molten lead which acts as the cathode and dissolves the magnesium electrolyzed. The magnesium is allowed to build up in the lead until the density of the lead-magnesium mixture begins to be nearly as low as the density of the melt being electrolyzed. Then the magnesium is distilled off from the lead.

The electricity for the electrolysis can be supplied by conventional means. However I prefer to supply the electricity needed by a power plant operating on the principle of magnetohydrodynamics using my revolving pebble bed heat exchanger for heat recovery, patent application Ser. No. 603,601.

Magnesium iodide according to the "Handbook of Chemistry and Physics," 30th ed., decomposes when heated as hot as 700° C. Thermodynamic calculations also predict that magnesium iodide will decompose though at a higher temperature. If heated hot enough the gaseous mixture formed will consist of magnesium vapor mixed with iodine vapor and, since the magnesium atom has such a smaller atomic weight than the iodine atom, the two atoms will be very easy to separate by the great difference in velocities that the two atoms will diffuse through holes under vacuum. The principle of the separation will be the same as used to separate uranium isotopes at Oak Ridge, Tenn., but since the differences between the weights of the atoms separated is so much greater, the temperature is so much higher and the compounds can easily be condensed under very high vacuums the separation is very much cheaper. The separation of magnesium and iodine vapors can be carried out by passing them under vacuum through a series of graphite plates containing small holes.

The big item of expense for the preceding thermal separation of magnesium iodide is the expense of heating the magnesium iodide. This I prefer to do by the principle of stratified gas heating which is old. In this method the magnesium iodide vapors will stay at the bottom of a refractory-lined vessel due to the vapors' higher density. It is preferred to add some mercury iodide to the magnesium iodide vapors to increase their density. Over the magnesium plus mercury iodide vapors is kept a layer of iodine vapors. Above the iodine vapors there is ash-free fuel burnt in air with the heat being transferred radiantly through the layer of iodine vapors and heating the magnesium iodide and decomposing it. This method allows the magnesium iodide to be heated to very high temperatures.

I prefer to carry out this stratified gas heating with the aid of my revolving pebble bed heat exchanger previously mentioned. The heating of the magnesium iodide is done near the circumference and in a revolving cylindrical vessel. On each end of the revolving vessel is one of my revolving pebble bed heat exchangers. My heat exchangers permit very efficient use of the heat. The carrying out of the stratified gas heating in a rapidly revolving vessel makes the forces keeping the various gases from mixing as much as 20 times as great (or even greater) than the force of gravity normally used with stratified gas heating.

When plastics are to be cast that are corrosive to magnesium the magnesium core is first given a coating of corrosion resisting paint or plastic.

In conclusion I may say that I have disclosed a method for making cores for casting organic polymers that costs only a small fraction of the cost of the polymer saved by making the article cast hollow. For very intricate and large castings such as of automobile bodies and house walls there are additional savings besides the amount of plastic saved. By making hollow-walled automobile bodies a substantial savings in weight is achieved which is very desirable for automobiles. By making hollow walls for houses, the hollow centers of the walls may be filled with insulation and thus my plastic house walls will be very well insulated.

I claim:

1. A method for casting organic polymers into hollow articles having an intricate internal configuration comprising casting the polymer into a mold having a magnesium core the configuration of which is complementary to the internal configuration of the articles formed, allowing the material to harden in the mold, removing the shaped article from the core by dissolving the magnesium core by a solution of iodine in an inert solvent, the organic polymer being substantially insoluble in the inert solvent, evaporating the inert solvent from the magnesium iodide obtained and separating the magnesium iodide into magnesium and iodine for reuse.

References Cited

UNITED STATES PATENTS

| | | |
|---|---|---|
| 1,406,730 | 2/1922 | Heany. |
| 2,315,394 | 3/1943 | Brosius. |

OTHER REFERENCES

Mellor's Comprehensive Treatise on Inorganic and Theoretical Chemistry, Supplement II, part I, Fl, Cl, Br, I, At, pp. 835, 848, 849, published 1956.

ROBERT F. WHITE, Primary Examiner

N. RUSHEFSKY, Assistant Examiner

U.S. Cl. X.R.

264—317